(12) United States Patent
Jimenez et al.

(10) Patent No.: US 11,067,185 B2
(45) Date of Patent: Jul. 20, 2021

(54) SYSTEMS AND METHODS FOR IMPROVED VALVE STEM COUPLING ASSEMBLY FOR ISOLATING THE TORQUE LOAD FROM THE THRUST LOAD

(71) Applicant: TapcoEnpro, LLC, Channelview, TX (US)

(72) Inventors: Filiberto Jimenez, Channelview, TX (US); Kenneth Krause, Sandy, UT (US)

(*) Notice: Subject to any disclaimer, the term of this patent is extended or adjusted under 35 U.S.C. 154(b) by 4 days.

(21) Appl. No.: 16/511,908

(22) Filed: Jul. 15, 2019

(65) Prior Publication Data

US 2021/0018105 A1    Jan. 21, 2021

(51) Int. Cl.
  *F16K 17/40*    (2006.01)
  *F16K 3/314*    (2006.01)
  *F16K 35/02*    (2006.01)

(52) U.S. Cl.
  CPC .............. *F16K 13/04* (2013.01); *F16K 3/314* (2013.01); *F16K 35/02* (2013.01)

(58) Field of Classification Search
  CPC ..................................................... F16K 3/314
  USPC .................................. 251/266, 326; 403/296
  See application file for complete search history.

(56) References Cited

U.S. PATENT DOCUMENTS

| | | | | |
|---|---|---|---|---|
| 1,415,658 A | * | 5/1922 | Lane | E21B 17/046 403/27 |
| 3,076,474 A | * | 2/1963 | Skomp | E03B 9/04 137/307 |
| 3,648,718 A | * | 3/1972 | Curran | F16K 47/02 137/269 |
| 3,788,600 A | * | 1/1974 | Allen | F16K 17/383 251/214 |
| 3,851,983 A | * | 12/1974 | MacKenzie | F16B 7/0426 403/312 |
| 4,068,957 A | * | 1/1978 | Brems | B23Q 7/1489 198/741 |
| 4,541,608 A | * | 9/1985 | Forester | F16K 3/0254 251/191 |
| 7,118,300 B2 | * | 10/2006 | Bacskay | F16D 1/04 403/312 |
| 2003/0116742 A1 | * | 6/2003 | Anderson | F16K 37/0008 251/326 |
| 2011/0208315 A1 | * | 8/2011 | Anapliotis | A61F 2/3836 623/20.24 |

* cited by examiner

*Primary Examiner* — Robert K Arundale
(74) *Attorney, Agent, or Firm* — Michael F. Krieger; Kirton McConkie

(57) ABSTRACT

A coupler that separates a unitary valve stem into two separate but coupled sections to isolates the thrust load from the torque load.

14 Claims, 7 Drawing Sheets

SYSTEMS AND METHODS FOR IMPROVED VALVE STEM COUPLING ASSEMBLY FOR ISOLATING THE TORQUE LOAD FROM THE THRUST LOAD

CROSS-REFERENCE TO RELATED APPLICATIONS

The application does not claim priority to another pending application.

TECHNICAL FIELD

The present disclosure relates generally to a gate valve stem coupling assembly. More particularly, the disclosure relates to systems and methods for isolating the thrust load and the torque load exerted on a unitary stem.

BACKGROUND

Stems used to connect an actuator to a gate are often match drilled. However, match drilled stems bear both a thrust load and a torque load. When an overtorque condition occurs the stem can be damaged requiring the entire gate to be taken off-line for a new stem to be used. Thus a system and method is needed to isolate the torque load and the thrust load. A further method is needed to prevent damage to the stem when overtorque occurs. A further need exists whereby replacement stems can be pre-manufactured and shipped when a stem is damaged and needs to be replaced.

BRIEF SUMMARY

The general purpose of the systems and methods disclosed herein is to provide an engineered solution to resolve stem connection problems in gate valves. Specifically, a coupler couples a first stem configured to bear a thrust load and a second stem configured to bear a torque load. In one non-limiting embodiment, the apparatus comprises a first stem, a second stem and a coupling assembly. In one embodiment, the positions of the stems within the coupler are secured by securing pins which pass through channels formed in the coupler, through the end of the respective stem to prevent the stem from twisting. In some embodiments the first stem is coupled to a valve gate and the second stem is coupled to an actuator. The overall apparatus is configured to isolate the thrust force exerted on the first stem and the torque force exerted on the second stem. In addition, when the valve is placed in an overtorque condition the securing pin is engineered to shear and fail before any other part of the coupling assembly is damaged. In addition, the coupling assembly is designed to allow replacement of damaged securing pins without taking the valve off-line by providing an access door to remove and replace the failed pin. This apparatus is designed to work in conjunction with a variety of existing valves, but it could also be included in conjunction with a coke drum deheading valve.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment, but may refer to every embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The features and advantages of the present disclosure will become more fully apparent from the following description and appended claims, or may be learned by the practice of the invention as set forth hereinafter.

BRIEF DESCRIPTION OF THE DRAWINGS

In order to describe the manner in which the advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
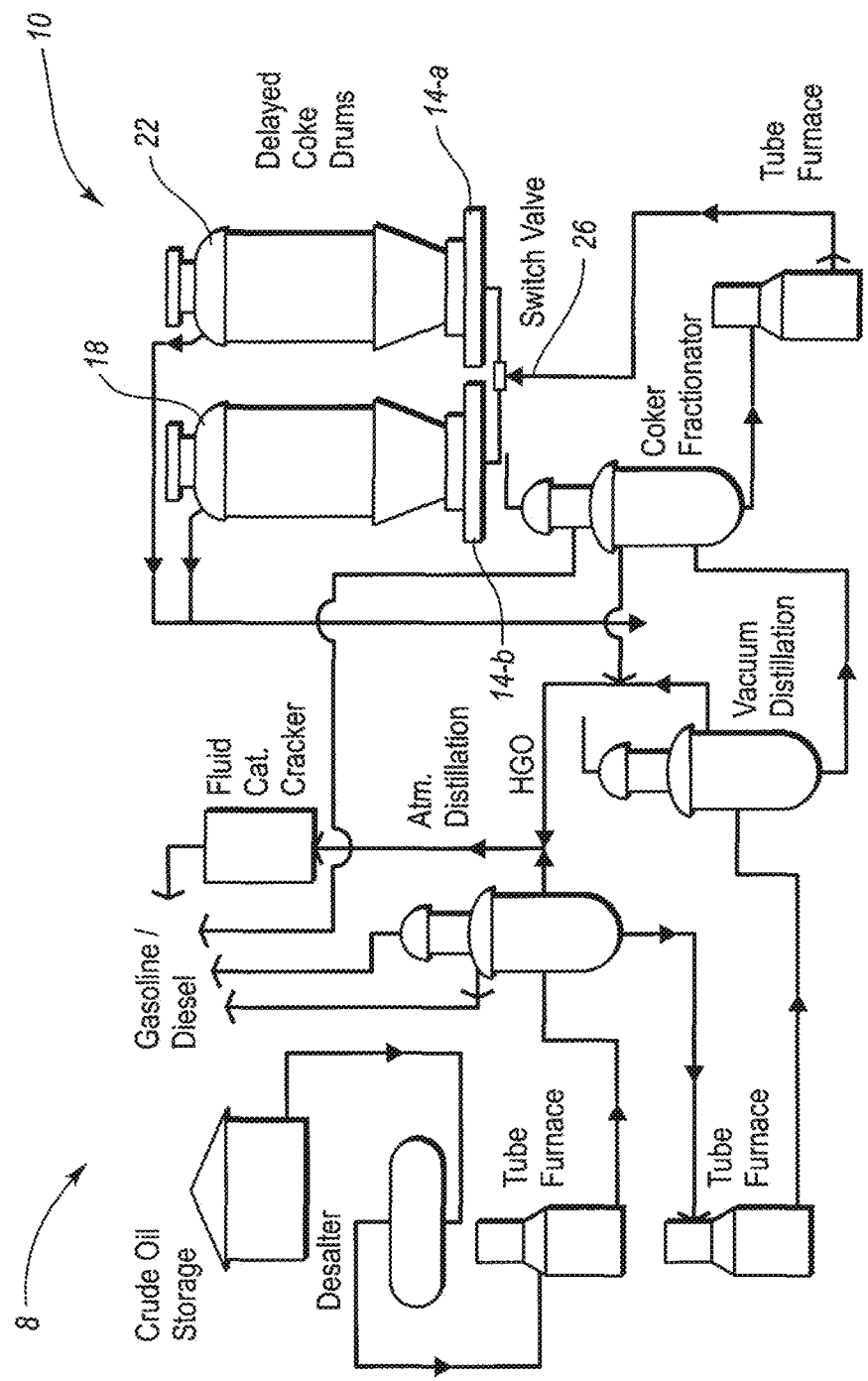
FIG. 1 illustrates the coking process.

The present embodiments of the present invention will be best understood by reference to the drawings, wherein like parts are designated by like numerals throughout. It will be readily understood that the components of the disclosed invention, as generally described and illustrated in the figures herein, could be arranged and designed in a wide variety of different configurations. Thus, the following more detailed descriptions of the embodiments of the apparatus, as represented in FIGS. 1-9 are not intended to limit the scope of the invention, as claimed, but are merely representative of present embodiments of the invention. Some embodiments comprise properly sizing the valve mechanisms with sufficient Safety Factors ("S.F.") applied such that the valve mechanism is stronger from inside the valve outward to the actuator. Some embodiments comprise properly sizing actuation/operator to provide continual valve operation without excessive or undue thrust output. In some embodiments, in an overtorque condition, the invention comprises an easy to repair failure point that is external and accessible without major disassembly required. In some embodiments, in an overtorque condition, the invention comprises a design so that no major expense will be incurred to repair a valve. In some embodiments, in an overtorque condition, the invention comprises a design so that the valve will not be taken off-line to be repaired.

In the following description, numerous references will be made to actuators, gates and other valve structures which are not shown in detail in the figures. However, it should be understood that one of ordinary skill in the art and in possession of this disclosure, would readily understand how the present disclosure and existing valve structures can be incorporated.

Detailed references will now be made to the preferred embodiments of the disclosed invention, examples of which are illustrated in FIGS. 1-9 which illustrate various views of a gate valve stem coupling assembly 300 in accordance with one or more embodiments of the invention.

General Discussion on the Delayed Coking Process and the De-Heading of Coke Drums In the typical delayed coking process, petroleum residues are fed to one or more coke drums where they are thermally cracked into light products and a solid residue—petroleum coke. Several different physical structures of petroleum coke may be produced. To produce the coke, a delayed coker feed originates from the crude oil supplied to the refinery and travels through a series of process members and finally empties into one of the coke drums used to manufacture coke. A basic refinery flow diagram is presented as FIG. 1, with two coke drums shown.

Due to the shape of the coke drum, coke accumulates in the area near and attaches to the flanges or other members used to close off the opening of the coke drum during the manufacturing process. To empty the drum, the flanges or members must first be removed or relocated. In the case of a flanged system, once full, the coke drum is vented to atmospheric pressure and the top flange is unbolted and removed to enable placement of a hydraulic coke cutting apparatus. Removing or opening the bottom flange, or valve is commonly known as "de-heading" because it removes or breaks free the head of coke that accumulates at the surface of the flange or valve. Once the flanges are removed, the coke is removed from the drum by drilling a pilot hole from top to bottom of the coke bed using high pressure water jets. Following this, the main body of coke left in the coke drum is cut into fragments which fall out the bottom and into a collection bin, such as a bin on a rail cart, etc. The coke is then dewatered, crushed and sent to coke storage or a loading facility.

Embodiments of a Coke Drum De-Heading Systems

Although the present disclosure may be utilized in association with both top and bottom de-heading systems, or rather the de-heading system independent valve actuator system of the disclosed invention may be applicable and utilized on both the top and bottom openings of a coke drum, the following detailed description and preferred embodiments will be discussed in reference to a bottom de-heading system only. One ordinarily skilled in the art will recognize that the invention as explained and described herein for a coke drum bottom de-heading system may also be designed and used as a coke drum top de-heading system or to control flow in many other processes.

The present disclosure describes a valve system and method for unheading or de-heading a coke drum following the manufacture of coke therein. As the disclosed invention is especially adapted to be used in the coking process, the following discussion will relate specifically in this manufacturing area. It is foreseeable however, that the disclosed invention may be adapted to be an integral part of other manufacturing processes producing various elements or by products other than coke, and such processes should thus be considered within the scope of this application. For example, it is contemplated that the disclosed invention de-header system and de-header valves may be utilized within other critical service applications, such as inlet feed line isolation, blowdown isolation, fractionator isolation, and back warming.

FIG. 1 depicts, generally, a petroleum manufacturing and refinery process 8 having several elements and systems present (identified, but not discussed). In addition to these elements, petroleum manufacturing and refinery process 8 further comprises at least one coke drum and may include, as illustrated, a first and a second coke drum 18 and 22, respectively, and de-header valves 14-a and 14-b attached thereto. In typical delayed coking operations, there are at least two coke drums in simultaneous operation so as to permit the ongoing, batch continuous, manufacture and refinery of petroleum as well as its coke byproduct.

Figure 2:
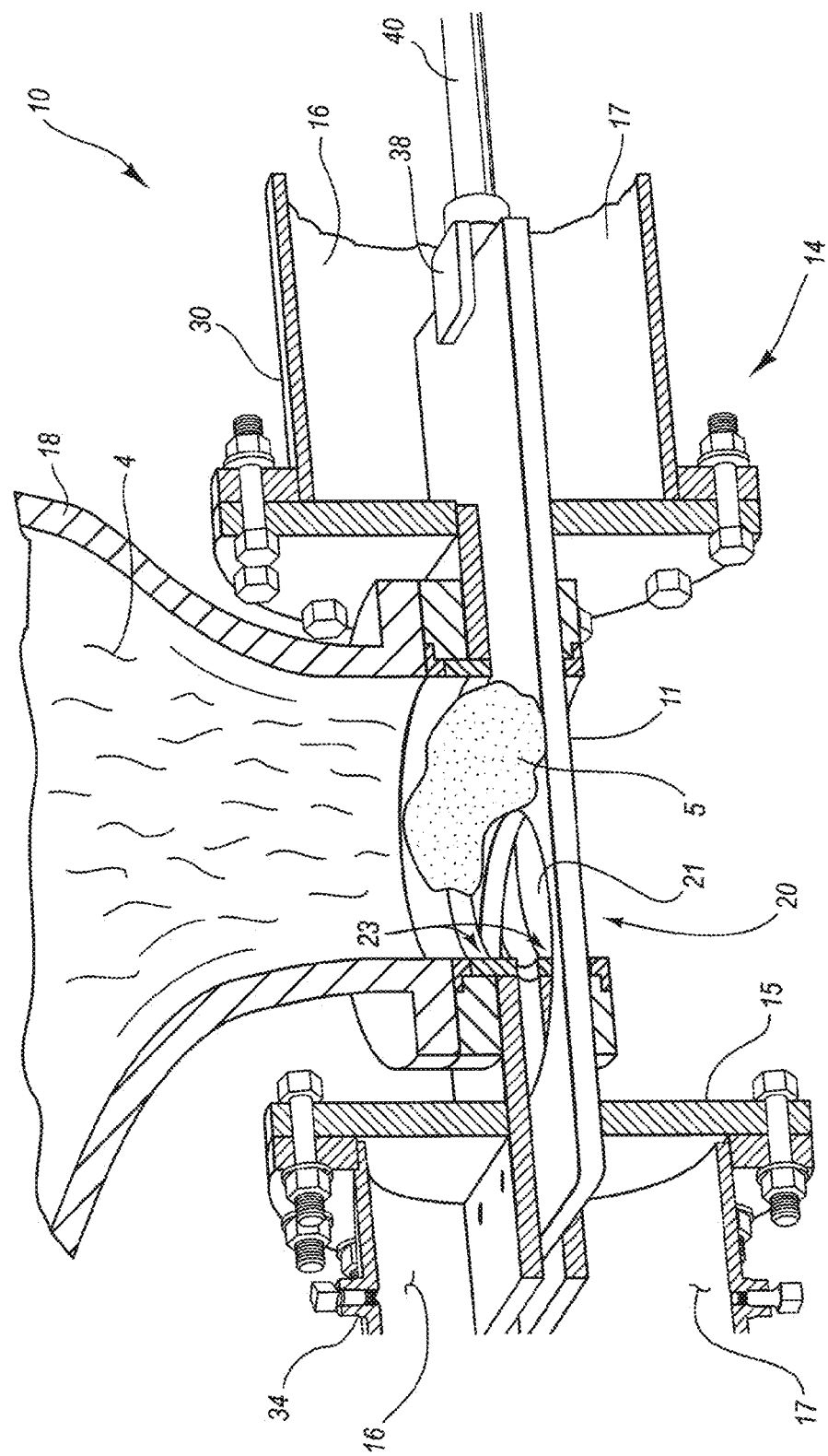
FIG. 2 illustrates a coke drum and deheader valve.

FIG. 2 illustrates a non-limiting example of a de-heading system 10. Coke drum de-heading system 10 comprises a de-header valve 14 that removably couples to a coke drum 18 using various means known in the art. De-header valve 14 typically couples to coke drum 18 or a spool at its flanged port or opening, much the same way a flanged head unit would be attached in prior related designs. De-header valve 14 is shown further attaching to upper and lower bonnets 30 and 34, respectively.

The seat system of the de-header valve is designed to cleanly break the bond between the coke and the exposed surface of the valve closure at each stroke. The total thrust required for this action combined with the thrust required to overcome seating friction and inertia is carefully calculated and is accomplished by actuating the valve closure, thus causing it to relocate or transition from a closed to an open position.

FIG. 2 illustrates a non-limiting example of a sliding blind gate-type de-header valve 14, according to one exemplary embodiment of the disclosed invention. Sliding blind gate-type de-header valve 14 comprises a main body 15 removably coupled to upper and lower bonnets 30 and 34, each comprising upper and lower chambers 16 and 17, respectively. Main body 15 comprises an opening or port 20 therein. Main body 15 removably couples to a complimentary flange portion and associated opening or port of a coke drum 18 or a spool, such that each opening is concentric and aligned with one another.

Sliding blind gate-type de-header valve 14 further comprises a valve closure in the form of a sliding blind or gate 11. Some embodiments of a gate 11 may have an aperture therein that is capable of aligning with the opening in the coke drum and/or the opening in the spool, as well as the opening in the main body of the valve 20. Alternatively, some gates may be solid, not utilizing an aperture therein, but rather utilizing a short gate that effectively opens the valve to allow coke from a coke drum 18 to fall through a valve when the shortened gate 11 is retracted into the upper bonnet 30.

The gate 11 slides back and forth in a linear, bi-directional manner between means for supporting a valve closure, shown in this exemplary embodiment as seat support system 23. Seat support system 23 may comprise any type of seating arrangement, including dual, independent seats, wherein the seats are both static, both floating or dynamic, or a combination of these. Seat support system 23 may alternatively comprise a single seat in support of valve closure 11, wherein the seat may comprise a static or floating or dynamic seat. In another exemplary embodiment, means for supporting a valve closure may dispense with a seating system in favor of a support system built into main body 15, such that one or more portions or components of main body 15 are selected and prepared to support valve closure 11. In any event, seat support system may comprise a metal contact surface 25 that contacts and seals with a metal surface on valve closure 11, wherein this contact seal is maintained during the coke manufacturing process.

Valve closure 11 is coupled to clevis 38, which is turn coupled to valve stem 40. Valve stem 40 may be utilized as an element of a system that functions to cause valve closure 11 to oscillate between an open and closed position. An actuator system 36 may be a hydraulically controlled power source contained within cylinder and that is capable of moving valve closure 11 through its linear, bi-directional cycle during a coking process, and may be utilized to de-head and re-head the coke drum 18. Alternatively, an actuator system 36 may be an electrically controlled power source utilizing an electric actuator 42 that is capable of moving a valve closure via a transmission system 44 through its linear, bi-directional cycle during a coking process, and may be utilized to dehead and rehead the coke drum.

Figure 3:
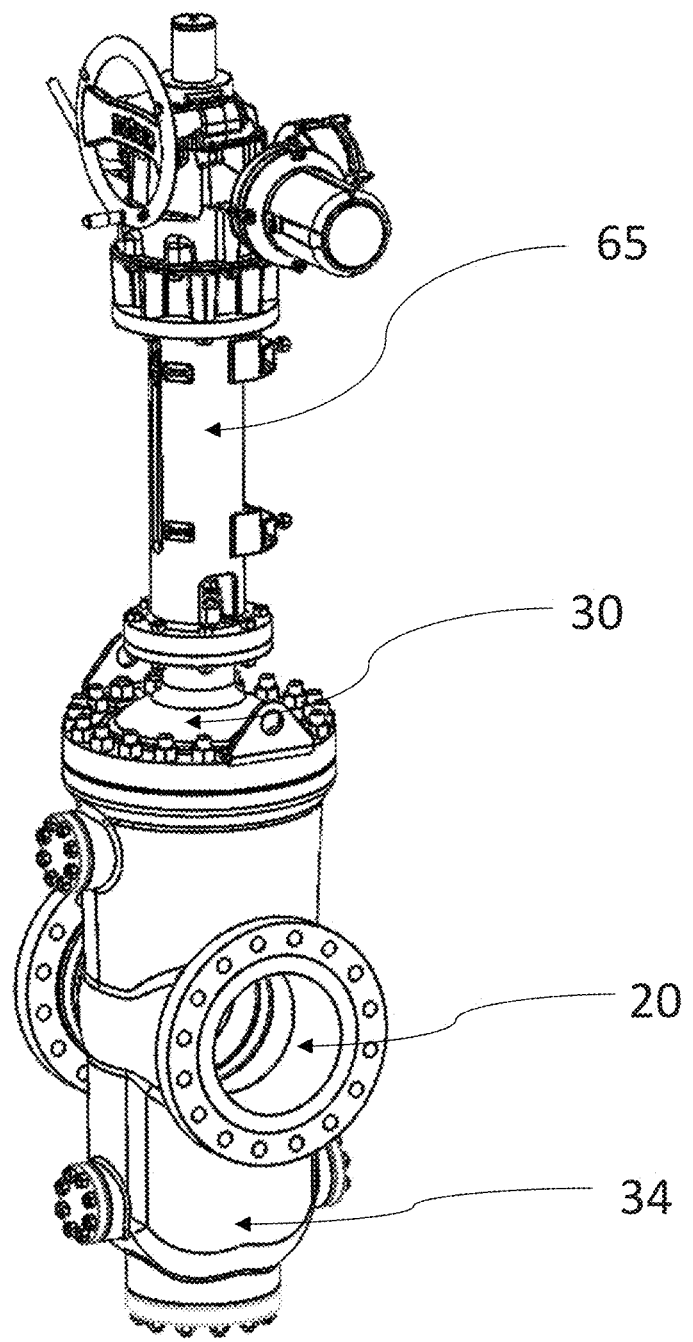
FIG. 3 illustrates an actuator and valve.
Figure 4:
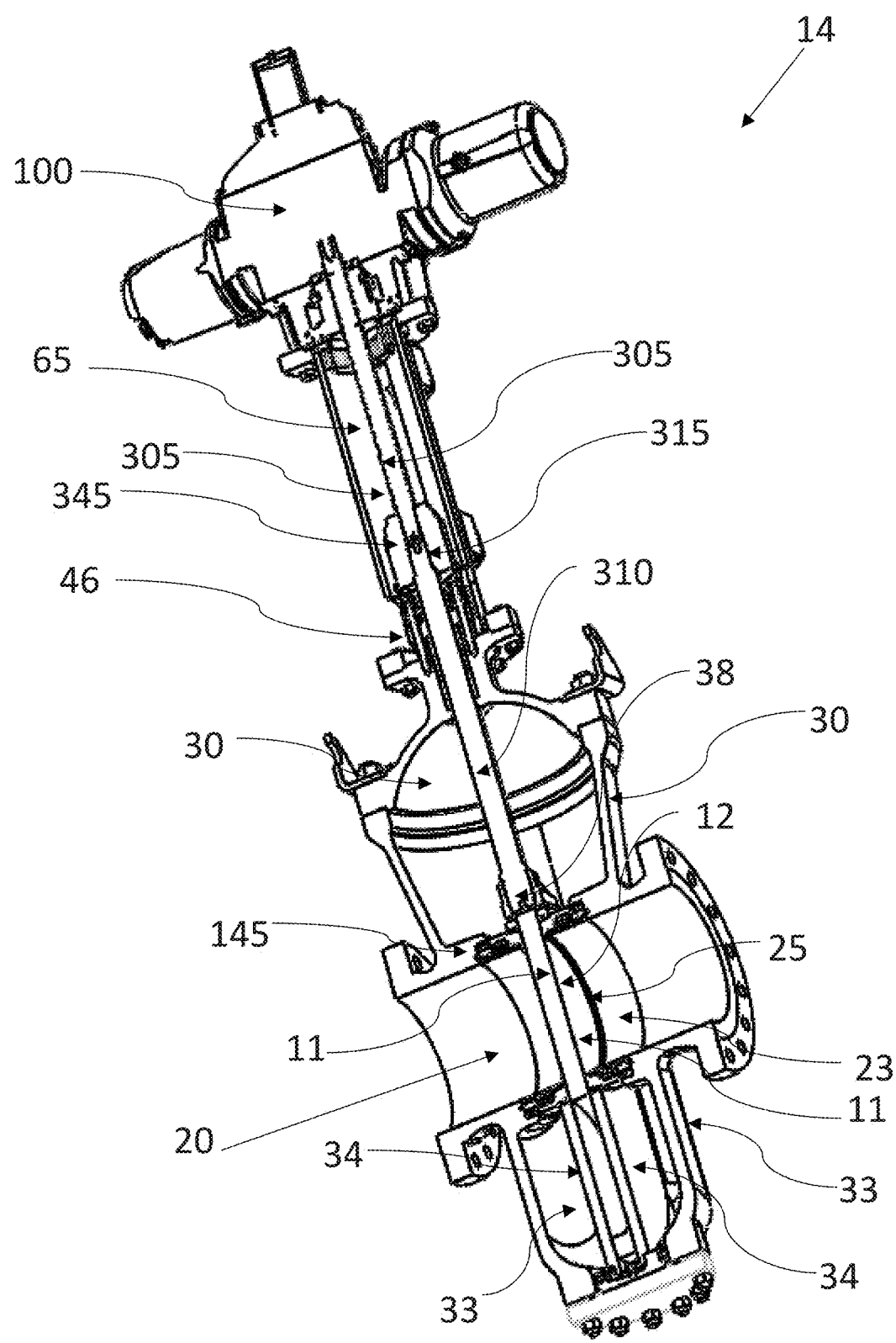
FIG. 4 illustrates cross-section of actuator and valve.
Figure 5:
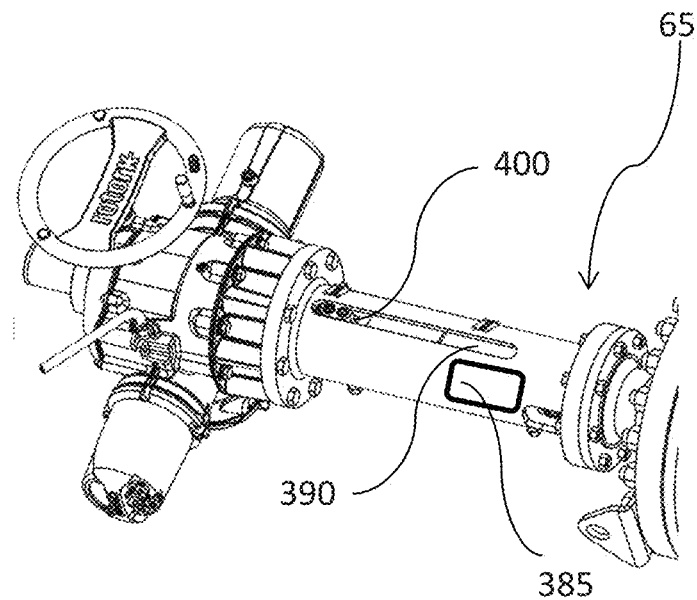
FIG. 5 illustrates an actuator and actuator housing.
Figure 6:
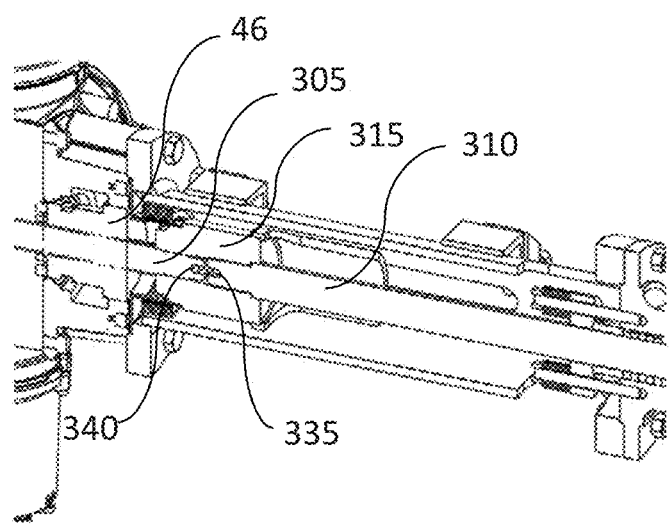
FIG. 6 illustrates a cut away view of an actuator housing with stems and coupler.
Figure 7:
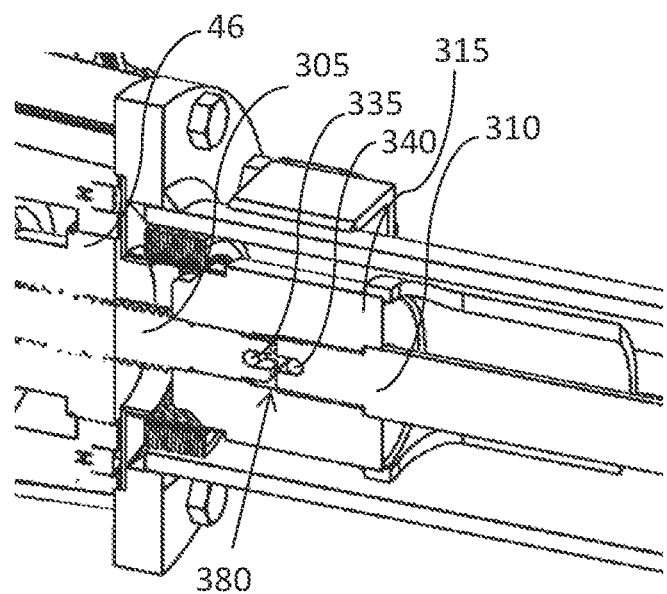
FIG. 7 illustrates a cut away view of an actuator housing with stems and coupler.

Detailed references will now be made to the preferred embodiments of the disclosed invention, examples of which are illustrated in FIGS. 3-4. In some embodiments coke drum de-heading system 10 is disclosed wherein a valve 14 comprising an actuator housing 65, an upper bonnet 30, a valve opening 20 and lower bonnet 34. In some embodiments the valve 14 comprises a gate 11 configured to slide bi-directionally between the upper bonnet 30 and the lower bonnet 33. In some embodiments the valve opening 20 comprises a blind or gate 11. In some embodiments the valve 14 comprises a seat 23 configured to bias the valve against the gate 11 to isolate the valve opening 20 from the interior valve body. The gate-seat interface 25 is configured to seal in process and other contaminants and isolate the opening 20 from the valve interior of the body using a biasing mechanism 145 which biases the seat 23 against the gate 11. In some embodiments the gate 11 is coupled to a second end of a second stem 310 by a clevis pin 38, while the first end of a second stem is coupled to a coupler 315. In some embodiments a first end of a first stem 305 is coupled to the coupler while the second end of the first stem is coupled to an actuator 100. In some embodiments the actuator housing 65 may be a hollow housing configured to house other components. In some embodiments the actuator housing 65 may enclose interior components. In some embodiments the actuator housing 65 may partially enclose internal components. In some embodiments the actuator housing 65 may comprise an internal lubricant pooled in the actuator housing 65 and circulated around internal components to reduce friction caused by movement of internal components. In some embodiments the actuator housing 65 may be rigid and configured to provide structural support to internal components, as well as brace against a torque moment created during actuation by the operation of internal components. In some embodiments the internal components housed in the actuator housing 65 are internally lubricated, and the actuator housing 65 may have access ports which are not sealed. In some embodiments the actuator housing 65 may a power port 90 to power the actuator mechanism which may be powered pneumatically, electrically or mechanically.

In some embodiments the actuator housing 65 houses a coupling assembly 345 disposed within the actuator housing. In some embodiments the coupling assembly 345 comprises a coupler 315 which couples a first stem 305 and a second stem 310. In some embodiments the actuator comprises an actuator motor 100 disposed on the actuator end of the actuator housing 65. In some embodiments the actuator motor 100 is pneumatically powered. In some embodiments the actuator motor 100 is electrically powered. In some embodiments the actuator 100 is manually driven. In some embodiments the actuator housing 65 comprises a channel through which an indicator indicates the position of the nut housing. In some embodiments the indicator channel indicates the position of the gate in its stroke. In some embodiments the indicator channel will indicate to an operator whether the gate is open, partially open or closed. In some embodiments the actuator is configured to move the stem 305 or 310 bi-directionally through the valve 14 to cause a gate or blind 11 to move to an open or a closed direction.

Referring now to FIGS. 5-9, in some embodiments a gate valve stem coupling assembly 300 for isolating the torque load 350 from the thrust load 355 is disclosed. In some embodiments the gate valve comprises an actuator housing 65. In some embodiments the actuator housing 65 is disposed between an actuator 100 on a first end and a bonnet 33 on a second end. In some embodiments the actuator housing comprises a main channel running longitudinally through the length of the actuator housing 65. In some embodiments the actuator housing 65 comprises a viewing aperture 390 formed in the side of the housing 65 which permits the physical inspection of the gate position, whether open or closed. In some embodiments the actuator housing 65 further comprises an access door 385 which permits access to the actuator housing's 65 main channel.

In some embodiments the coupling assembly comprises a first stem 305. In some embodiments the first stem 305 is disposed in the actuator housing's 65 main channel. In some embodiments the first stem 305 is smooth and slides inside the actuator housing 65 as the first stem 305 is actuated to open or close a gate 11. In some embodiments the first stem extends distally along the actuator housing's 65 longitudinal axis towards the bonnet 30. In some embodiments the distal end of the first stem 305 is coupled to a gate 11. In some embodiments the first stem is coupled to the gate 11 by a clevis connector. In some embodiments actuation of the gate exerts a thrust load 355 on the first stem 305.

In some embodiments the distal end of the first stem 305 comprises a clevis pin. In some embodiments the proximal end of the first stem 305 comprises an insertion end. In some embodiments the proximal end of the first stem 305 is configured to receive a securing pin such as by a clevis. In some embodiments the first stem 305 insertion end is threaded and configured to screw into a threaded receiver. In some embodiments the proximal end of the first stem 305 is forked 370. In some embodiments the coupler 315 end of the first stem 305 comprises a forked receiving portion 370 configured to receive the first pin at a variety of positions along in the fork 370.

In some embodiments the coupling assembly further comprises a second stem 310 disposed inside the actuator housing 65. In some embodiments the second stem 310 is aligned with and extending opposite the proximal end of the first stem 305. In some embodiments the second stem 310 is threaded. In some embodiments the distal end of the second stem 310 engages an actuator 100. In some embodiment the actuator is a planetary roller screw which engages the threaded screw and actuates the coupling assembly 300. In some embodiments actuation by the actuator 100 exerts a torque load 350 on the second stem.

In some embodiments the proximal end of the second stem 310 comprises an insertion end. In some embodiments the second stem 310 insertion end is threaded and configured to screw into a threaded receiver. In some embodiments the proximal end of the second stem 310 is configured to receive a securing pin such as by a clevis. In some embodiments the proximal end of the second stem 310 is forked 370. In some embodiments the coupler 315 end of the second stem 310 comprises a forked receiving portion 370 configured to receive the second pin configured to receive the first pin at a variety of positions along in the fork 370.

In some embodiments a coupler 315 is disposed inside the actuator housing 65. In some embodiments the coupler comprises a first stem receiving channel 320. In some embodiments the first stem receiving channel is threaded. In some embodiments the coupler 315 comprises a second stem receiving channel 325. In some embodiments the second stem receiving channel 325 is threaded. In some embodiments the first stem receiving channel 320 and the second stem receiving channel 325 are aligned. In some embodiments the threaded receiving end of the proximal end of the first stem 315 is screwed into the first stem receiving channel 320. In some embodiments the threaded ends 305 and 310 are v-threads (aka vee threads). In some embodiments the threads comprise an 8 pitch to support the thrust load 355 placed there on. In some embodiments the second stem 310 is screwed into the second stem receiving channel 325. In some embodiments the first stem 305 and the second stem 310 are coupled together when the first stem 305 and the second stem 310 are inserted into the coupler 315.

In some embodiments the first stem 305 is selectively coupled to the first stem receiving channel 320, the second stem 310 is selectively coupled to the second stem receiving channel 325, a first securing pin 335 is selectively inserted in the first pin receiving channel 330 so as to secure the orientation of the first stem 305 in the first stem receiving channel 320 and a second securing pin 340 is selectively inserted in the second receiving channel so as to secure the orientation of the second stem 310 in the stem receiving channel 325 wherein the first 305 and second 310 stem, first 335 and second 340 securing pin and coupler 315 comprise the coupling assembly 345.

In some embodiments the coupler 315 comprises a plurality of pin receiving channels 330. In some embodiments the pin receiving channels 350 are orthogonal the coupler's 315 longitudinal axis. In some embodiments the channels are formed at an angle other than orthogonal the longitudinal axis. In some embodiments a pair of pin receiving channels 330 are aligned on opposite sides of the coupler 315 and configured to receive a pin 335, 340 selectively inserted into the pin receiving channel 330. In some embodiments the pin 335, 340 can be inserted into the pin receiving channels 330 from either side of the coupler 315. In some embodiments the threaded receiving channels 330 are threaded. In some embodiments, coupler 315 further comprises securing screws 395 which are screwed into the threaded pin receiving channels 330 to secure the securing pin 335, 340 in the pin receiving channels 330. In some embodiments the rotational orientation of first stem 305 and the rotational orientation of the second stem 310 are secured in place when the securing pin 335, 340 are inserted into the pin receiving channels 330.

In some embodiments the coupling assembly further comprises anti-rotation blocks 400. In some embodiments anti-rotation blocks 400 are secured to the assembly by securing screws 395 which pass through anti-rotation blocks 400 before screwing into coupler 315. In some embodiments blocks 400 sit in apertures 390. In some embodiments as actuator 100 turns it exerts a torque on the assembly, anti-rotation blocks 400 stabilize the unit by pressing against the apertures 390 and prevent the torque force from being transferred past the coupler 315. In some embodiments blocks 400 serve as wear pads. In some embodiments blocks 400 indicate the position of the 315 coupler and thus the position of the gate 11, whether open or closed.

In some embodiments the coupling assembly 300 is assembled by hand wherein the first stem 305 is screwed into the first stem receiving channel 320 by hand to achieve the desired depth of engagement. The first securing pin 335 is then inserted into the pin receiving channel 330 intersecting the proximal end of the first stem 305 so as to prevent the first stem from rotating. In some embodiments the length of the forked receiving portion 370 of the proximal end of the first stem 305 is greater than the width of the securing pin 335 so that the securing pin 335 can be inserted when the first stem 305 is positioned at a variety of depths in the first stem receiving channel 320.

In some embodiments the second stem 310 is screwed into the second stem receiving channel 325 by hand to achieve the desired depth of engagement. The second stem receiving pin 340 is then inserted into the pin receiving channel 330 intersecting the proximal end of the second stem 310 so as to prevent the second stem 310 from rotating. In some embodiments the length of the forked receiving portion 370 of the proximal end of the second stem 310 is greater than the width of the second securing pin 340 so that the securing pin 340 can be inserted when the second stem 310 is positioned at a variety of depths in the second stem receiving channel 325.

In some embodiments the coupling of the first stem and the second stem isolates the torque 350 and thrust 355 loads created during actuation. In some embodiments isolating the respective loads protects either securing pin 335, 340 from having to bear the both the tensile load, the shear and torsion forces. In some embodiments first securing pin 335 is isolated from the combined stresses created as the stem actuates. In some embodiments the first pin 335 is a shear pin and which resists torque only and operates in double shear.

In some embodiments the coupling vee threads handle only the tensile load due to the thrust generated by the acme screw.

Figure 8:
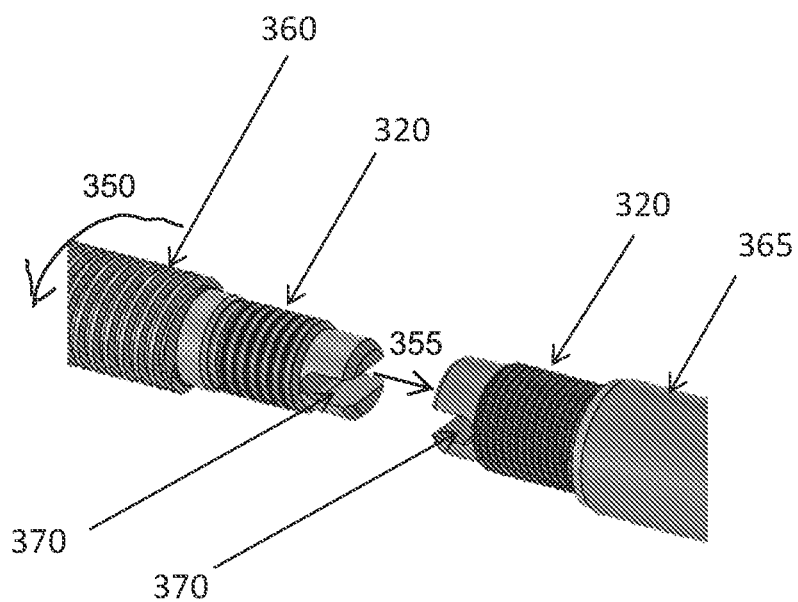
FIG. 8 illustrates the proximal end of the first stem and the second stem.
Figure 9:
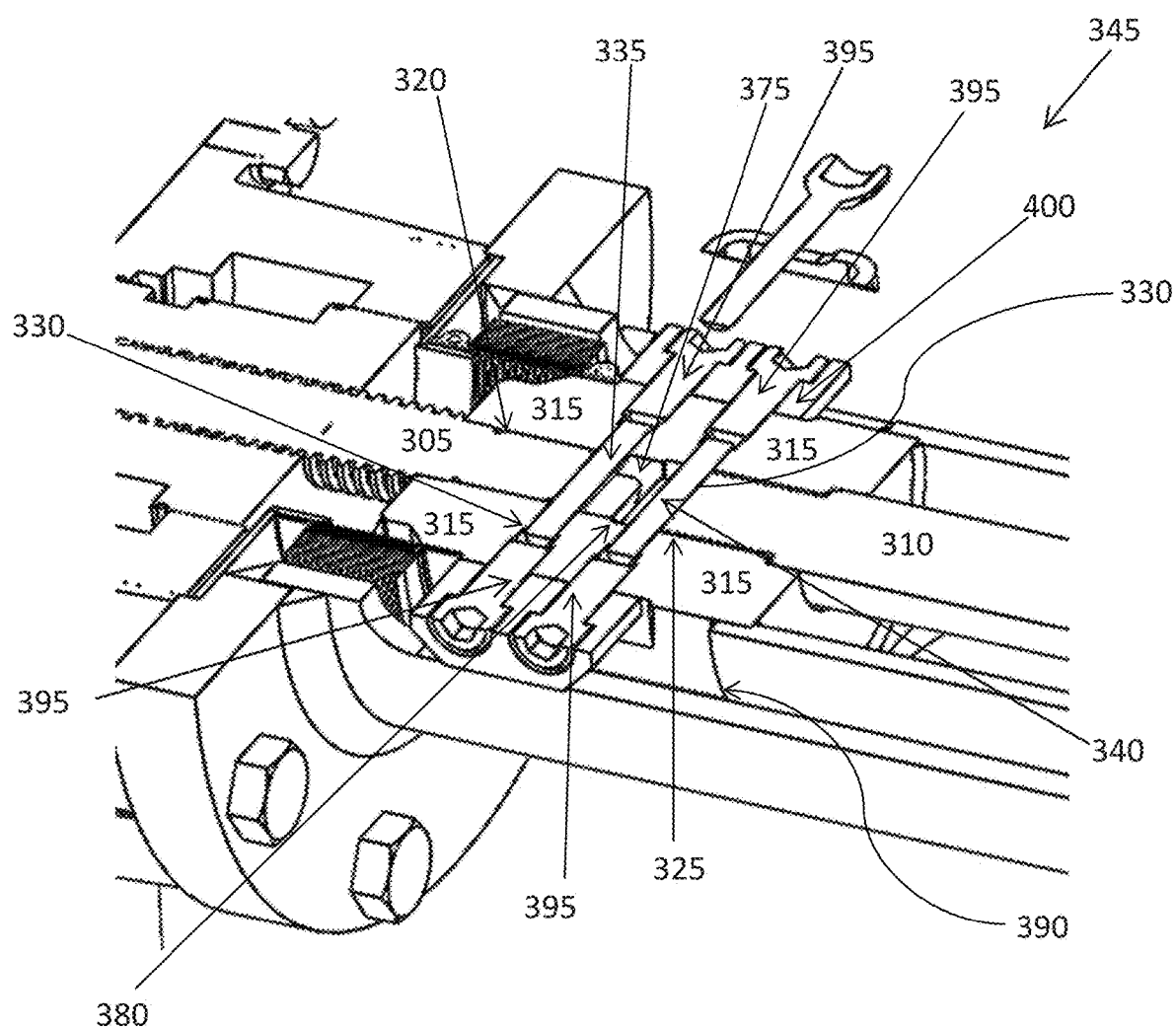
FIG. 9 illustrates a detailed view of the coupling assembly.

In some embodiments the coupler 315 is configured to couple the first stem 305 and the second stem 310 so as to isolate a torque load 350 and a thrust load 355. Some embodiments apply the design protocol with Safety Factors applied such that the valve connections are stronger from the inside of the valve 14 outward to the actuator 100. In some embodiments at least one of securing pin 335, 340 comprise a torsional sear pin connection sized to exceed the actuator 100 maximum output (stronger than the second stem 310). In some embodiments at least one of securing pins 335, 340 will be designed to fail first, typically with a S.F. of 8. Referring to FIG. 8, in some embodiments the stem 360 has a smaller diameter at slot 370 causing the pin to fail first, with pin diameters being equal, versus first stem 365 with same slot 370 (torque=F*d). In some embodiments at force 360 stem is always higher.

In some embodiments the valve stem is in an overtorque condition, the coupler assembly 300 is designed to fail securing pin 340 at end of second stem. In some embodiments where a securing pin has failed the pin is easily accessible through the access door 385. In some embodiments, yoke slot 390 is used housing the anti-rotation blocks 400. In some embodiments an access door is opened, the securing screws 395 removed and the damaged securing pin 335, 340 is forced out of the pin receiving channel and a new pin 335, 340 such as a standard dowl pin, is inserted in to the pin receiving channel. In some embodiments the failed pin should always be pin 335, pin 340 should bin in good condition by may also be replaced to ensure new condition on repairing valve operator when replacing 335. In some embodiment engineering a pin to fail first protects the smooth stem 305 because the smooth stem 305 can only be replaced by taking the valve apart.

Some embodiments properly size the valve mechanisms with sufficient Safety Factors applied such that the valve mechanism is stronger from inside the valve 14 outward to the actuator 100. In some embodiments the threaded stem 310 and drive nut 46 are wear components and can be replaced in the field without taking the valve off-line. In some embodiments this is accomplished by removing the actuator 100 from the actuator housing 65 and removing the threaded stem 310.

In some embodiments acme threads used on the second stem 310 are sized to minimize wear and withstand combined tensile, torsional and bearing stresses at maximum actuator output. In some embodiments acme working thread connection is sized to exceed the actuator 100 maximum output. In some embodiments the acme threads are designed with low bearing stress between the threaded stem and the drive nut 46 to improve longevity and minimize wear.

In some embodiments the first securing pin 335 is engineered to fail before any other part of the coupler 315 assembly. In some embodiments the second securing pin 340 is engineered to fail before any other part of the coupler 315 assembly.

In some embodiments the coupler the coupler comprises an adjustment gap 380 between the proximal end of the first stem 305 and the proximal end of the second stem 310. In some embodiments the adjustment gap allows the selective placement of the gate 11 stroke position which can be adjusted by rotating the v-threads on the proximal end of the first stem or the proximal end of the second stem 310 for a precise stroke. In some embodiments the coupler is configured to allow the user to selectively set the depth of engagement between the stem and the coupler 315 so as to be adjusted by rotating the stem in the screw threads to adjust the position of the stem in the coupler 315. In some embodiments the coupler 315 comprises a gate coupled to the first stem 305 wherein the gate closed position is set or adjusted by the depth of engagement of the first stem 305 in the first stem 305 receiving channel so as to avoid an overtorque condition. Thus in some embodiments the gate is overtorqued by placing the gate 11 beyond an optimum closed position the securing pin fails to prevent damage to the smooth stem 305 or the coupling assembly 300.

It is to be understood that the embodiments of the disclosure disclosed herein are illustrative of the principles of the present invention. Other modifications that may be employed are within the scope of the disclosure. Thus, by way of example, but not of limitation, alternative configurations of the present disclosure may be utilized in accordance with the teachings herein. Accordingly, the present disclosure is not limited to that precisely as shown and described.

The invention claimed is:

1. A valve stem coupling assembly for isolating the torque load from the thrust load comprising:
   a first stem;
   a second stem;
   a coupler comprising
      a first stem receiving channel,
      a second stem receiving channel aligned with the first stem receiving channel,
      a plurality of pin receiving channels oriented nonparallel the first and second stem receiving channels wherein the first stem is selectively coupled to the first stem receiving channel, the second stem is selectively coupled to the second stem receiving channel, a first securing pin selectively inserted in the first pin receiving channel so as to secure the orientation of the first stem in the first stem receiving channel and a second securing pin selectively inserted in the second receiving channel so as to secure the orientation of the second stem in the stem receiving channel wherein the first and second stem, first and second securing pin and coupler comprise the coupling assembly;
   wherein the coupler is configured to couple the first stem and the second stem so as to isolate a torque load and a thrust load; and
   wherein the coupler end of the first stem comprises a forked receiving portion configured to receive the first pin at a variety of positions along in the fork.

2. The first stem of claim 1, wherein the first stem comprises a threaded stem.

3. The second stem of claim 1, wherein the second stem comprises a smooth stem.

4. The second stem of claim 1 wherein the coupler end of the second stem comprises a forked receiving portion configured to receive the second pin at a variety of positions along in the fork.

5. The coupler of claim 1, wherein the first securing pin is engineered to fail before any other part of the coupler assembly.

6. The coupler of claim 1, wherein the second securing pin is engineered to fail before any other part of the coupler assembly.

7. The coupler of claim 1, wherein the first and second stem receiving channels further comprise threaded walls configured to selectively receive the first stem and the second.

8. The coupler of claim 7, further comprising an adjustment gap between the first stem receiving channel and the second stem receiving channel configured to allow the depth of engagement between the first stem and the first stem receiving channel and the second stem and the second stem receiving channel to be adjusted by rotating the stem in the screw threads to adjust the position of the stem in the coupler.

9. The coupler of claim 8, further comprising a gate coupled to the first stem wherein the gate closed position is set or adjusted by the depth of engagement of the first stem in the first stem receiving channel so as to avoid an overtorque condition.

10. The coupler of claim 1, further comprising a first actuator coupled to the first stem and a gate coupled to the second stem wherein the gate is configured to selectively open and close, and wherein when the gate is over-torqued by placing the gate beyond an optimum closed position at least one of the first securing pin and the second securing pin is configured to fail before damage to the coupling assembly occurs.

11. The stem coupling assembly of claim 1, further comprising an actuator housing in which the coupling assembly is contained.

12. The actuator housing of claim 11, further comprising an access door configured to align with the pin receiving channels thereby permitting a user to selectively access the coupling assembly to replace a securing pin without decommissioning the valve stem coupling assembly.

13. A valve stem coupling assembly for isolating the torque load from the thrust load comprising:
- a actuator housing;
- a first stem;
- a second stem;
- a coupler, the coupler further comprising
  - a first stem receiving channel aligned with the longitudinal axis of the actuator housing,
  - a second stem receiving channel aligned with the first stem receiving channel,
  - a plurality of pin receiving channels oriented nonparallel the first and second stem receiving channels wherein the first stem is selectively coupled to the first stem receiving channel, the second stem is selectively coupled to the second stem receiving channel, a first securing pin selectively inserted in the first pin receiving channel so as to secure the orientation of the first stem in the first stem receiving channel and a second securing pin selectively inserted in the second receiving channel so as to secure the orientation of the second stem in the stem receiving channel wherein the first and second stem, first and second securing pin and coupler comprise the coupling assembly;
- securing bolts secured in the pin receiving channels configured to secure the securing pins in place;
- an access door disposed in the side of the actuator housing configured to provide access to the pin receiving channels; and wherein the coupler is configured to couple the first stem and the second stem so as to isolate a torque load and a thrust load.

14. A valve stem coupling assembly for isolating the torque load from the thrust load comprising:
- a first stem;
- a second stem;
- a coupler, the coupler further comprising
  - a first stem receiving channel,
  - a second stem receiving channel aligned with the first stem receiving channel,
  - a plurality of pin receiving channels oriented nonparallel the first and second stem receiving channels wherein the first stem is selectively coupled to the first stem receiving channel, the second stem is selectively coupled to the second stem receiving channel, a first securing pin selectively inserted in the first pin receiving channel so as to secure the orientation of the first stem in the first stem receiving channel and a second securing pin selectively inserted in the second receiving channel so as to secure the orientation of the second stem in the stem receiving channel wherein the first and second stem, first and second securing pin and coupler comprise the coupling assembly;
- wherein the coupler is configured to couple the first stem and the second stem so as to isolate a torque load and a thrust load;
- the stem coupling assembly further comprising an actuator housing in which the coupling assembly is contained; and
- wherein the actuator housing further comprises an access door configured to align with the pin receiving channels thereby permitting a user to selectively access the coupling assembly to replace a securing pin without decommissioning the valve stem coupling assembly.

* * * * *